United States Patent
Borghese et al.

(10) Patent No.: US 8,600,675 B1
(45) Date of Patent: Dec. 3, 2013

(54) SYSTEM AND METHOD FOR GENERATING TRAJECTORY DATA FOR AN AIRCRAFT IN FLIGHT

(75) Inventors: John W. Borghese, Cedar Rapids, IA (US); Sethu R. Rathinam, Cedar Rapids, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 149 days.

(21) Appl. No.: 13/115,485

(22) Filed: May 25, 2011

(51) Int. Cl.
*G01C 21/00* (2006.01)

(52) U.S. Cl.
USPC .......................................... 701/528

(58) Field of Classification Search
USPC .......................... 701/528, 522, 537
See application file for complete search history.

(56) References Cited

U.S. PATENT DOCUMENTS

| | | | |
|---|---|---|---|
| 6,134,500 A * | 10/2000 | Tang et al. | 701/528 |
| 8,321,072 B2 * | 11/2012 | Coulmeau et al. | 701/3 |
| 8,332,084 B1 * | 12/2012 | Bailey et al. | 701/10 |
| 8,340,843 B2 * | 12/2012 | Coulmeau et al. | 701/14 |
| 2010/0274419 A1 * | 10/2010 | Lacombe et al. | 701/4 |
| 2010/0324757 A1 * | 12/2010 | Hoofd et al. | 701/3 |
| 2011/0087428 A1 * | 4/2011 | Barnetche et al. | 701/200 |
| 2012/0215434 A1 * | 8/2012 | Subbu et al. | 701/120 |
| 2012/0265374 A1 * | 10/2012 | Yochum | 701/5 |

OTHER PUBLICATIONS

Joint Planning and Development Office, "Concept of Operations for the Next Generation Air Transportation System", Sep. 30, 2010, version 3.2.

* cited by examiner

*Primary Examiner* — James Trammell
*Assistant Examiner* — Michael D Lang
(74) *Attorney, Agent, or Firm* — Donna P. Suchy; Daniel M. Barbieri

(57) ABSTRACT

A present novel and non-trivial system and method for generating trajectory data for an aircraft in flight is disclosed. Data representative of an aircraft's current trajectory, aircraft parameter(s), and navigation service data are received. As embodied herein, the aircraft parameter(s) may be received from more than one aircraft. An optimized flight trajectory for the aircraft is determined from a trajectory optimizing function and based upon the aircraft's current trajectory data, the aircraft parameter(s) data, and the navigation service data. Then, dispatch center trajectory data representative of the optimized flight trajectory is generated and sent to at least one user such as an aircraft system of the aircraft and/or an air navigation service provider. As embodied herein, the trajectory optimization function could be based upon cost minimization, time minimization, an operator's internal prioritization, or any combination of these.

16 Claims, 9 Drawing Sheets

SYSTEM AND METHOD FOR GENERATING TRAJECTORY DATA FOR AN AIRCRAFT IN FLIGHT

BACKGROUND OF THE INVENTION

1. Field of the Invention

This invention pertains generally to the field of aviation which manages or generates flight path data or trajectory data for an aircraft in flight.

2. Description of the Related Art

In the United States ("U.S."), preparations have begun to implement the Next Generation Air Transport System ("NextGen"), a system designed to reduce the stress currently experienced by the U.S and address the expected growth in aircraft operations forecasted through 2025. A Concept of Operations ("ConOps") developed for NextGen are identified many NextGen capabilities which detail the overall effect desired through the implements of specific standards, processes, and conditions. One of these identified capabilities is an air traffic management ("ATM") capability known as Efficient Trajectory Management, which provides the ability to assign trajectories that minimize the frequency and complexity of aircraft conflicts through the negotiation and adjustment of individual aircraft trajectories and/or sequences when required by resource constraints.

The ConOps has identified many stakeholders (or users) including an air navigation service provider ("ANSP") and flight operators. The ANSP has been identified as providing ATM and air traffic control services for flight operators for the purpose of providing safe and efficient flight operations. ATM responsibilities include communications, navigation, and surveillance ("CNS"). Flight operators have been identified as planning and operating a flight within the National Airspace System ("NAS"), including flight crews, flight operations centers, and operators conducting private, business, scheduled air transport, government, and military flight operations.

One of the goals and objectives of NextGen is a concept of trajectory-based operations ("TBO"). The basis for TBO is knowing each aircraft's expected flight profile and time information beforehand. The specificity of four-dimensional trajectories ("4DT") is supposed to match the mode of operations and the requirements of the airspace in which the aircraft operates. A major benefit of 4DT is that it enables ANSPs and operators to assess the effects of proposed trajectories and resource allocation plans, allowing ANSPs and operators to understand the implications of demand and identify where constraints need further mitigation.

The flight management system ("FMS") is capable of storing flight path information as well as 4DTs; however, the information available to the FMS and other aircraft systems may be limited. As such, the FMS and other aircraft systems may not have full knowledge of information that is available to the operator if the operator desires to optimize the flight trajectory of not only one aircraft in flight but also a plurality of other aircraft in flight which the operator may operate.

BRIEF SUMMARY OF THE INVENTION

A present novel and non-trivial system and method for generating trajectory data for an aircraft in flight is disclosed herein. As disclosed herein, two-way communications are established between three parties: a dispatch center ("DC") of flight operators, an aircraft system of an aircraft in flight (and aircraft systems of other aircraft), and an ANSP. From data provided by the aircraft system(s) and the ANSP, the trajectory data generator of the DC has been configured to determine an optimized flight trajectory employing a trajectory optimization function, generate DC trajectory data representative of the optimized flight trajectory, and send the generated DC trajectory data to the other parties.

In one embodiment, a system for generating trajectory data for an aircraft in flight is disclosed. The system includes a source of current trajectory data of an aircraft, a source of aircraft parameter data, and a source of navigation service data. A trajectory data ("TO") generator is configured to receive the current trajectory data, the aircraft parameter data, and the navigation service data. Based upon this received data, an optimized flight trajectory is determined employing a trajectory optimization function. The TD generator is configured to generate the DC trajectory data representative of the optimized flight trajectory and send the generated data to at least one user, where the user could include the aircraft system and/or the ANSP. As embodied herein, the trajectory optimization function is based upon cost minimization, time minimization, an operator's internal prioritization, or any combination of these. In an additional embodiment, a source of proposed trajectory data is included in the system, and the TD generator is further configured to receive the proposed trajectory data, determine the acceptability of the proposed trajectory data, and include acceptability information in the DC trajectory data.

In one embodiment, a method for generating trajectory data for an aircraft in flight is disclosed, where the TD generator is configured to employ this method. The method includes receiving the current trajectory data, the aircraft parameter data, and the navigation service data. Then, after this data is received, an optimized flight trajectory is determined by employing a flight optimization function to this data. Then, DC trajectory data is generated and sent to at least one user. In an additional embodiment, proposed trajectory data is received, the acceptably of the proposed trajectory data is determined, and acceptability information of the proposed trajectory data is included in the DC trajectory data.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
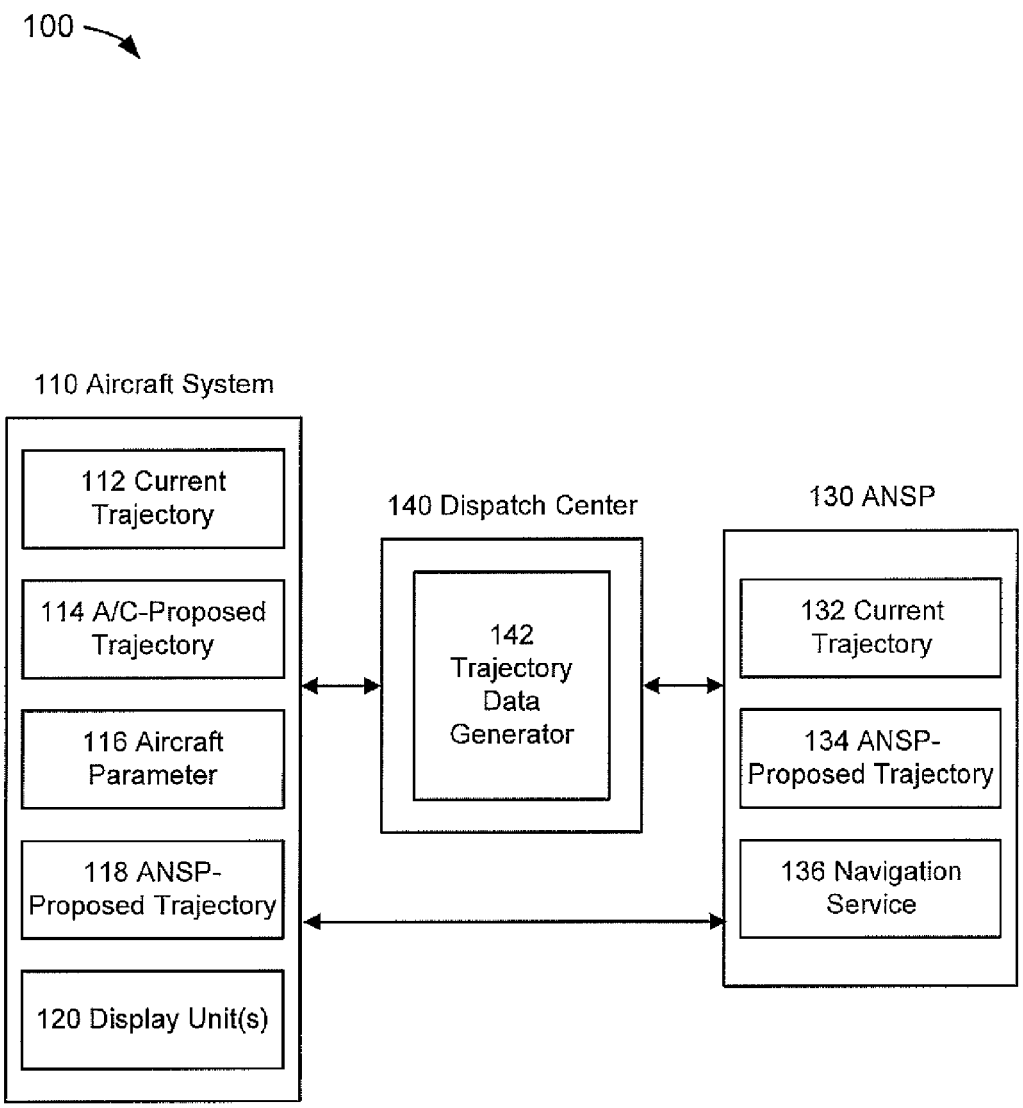
FIG. 1 depicts a block diagram of a trajectory data generating system.

FIG. 1 depicts a block diagram of a trajectory data ("TD") generating system 100 suitable for implementation of the techniques described herein. The TD generating system 100 of an embodiment of FIG. 1 includes an aircraft system 110, an air navigation service provider ("ANSP") 130, and a dispatch center ("DC") 140.

In an embodiment of FIG. 1, the aircraft system 110 could be comprised of the system or systems installed in the aircraft that could provide source data to the DC 140 via a datalink system or other system in which data may be communicated to users external to the aircraft. As embodied herein, the aircraft system 110 could be comprised of the system or systems installed in multiple aircraft, each of which could provide source data to the DC 140. The source data could be comprised of current trajectory data 112, aircraft-proposed trajectory data 114, aircraft parameter data 116, and/or ANSP-proposed trajectory data 118. In addition, the aircraft system 110 could include display unit(s) 120 on which symbology representative of current trajectory data 112, aircraft proposed data 114, and/or proposed trajectory data 118 could be presented to a pilot.

It should be noted that data, as embodied herein, could be comprised of any analog or digital signal, either discrete or continuous, which could contain information. As embodied herein, signals are synonymous with data. Aircraft could mean any manned or unmanned vehicle which is able to fly through the air, atmosphere, and/or space including, but not limited to, lighter than air vehicles and heavier than air vehicles, wherein the latter may include fixed-wing and rotary-wing vehicles. Additionally, aircraft could be watercraft capable of operating on or beneath water.

In an embodiment of FIG. 1, current trajectory data 112 may be data representative of a trajectory that has been assigned to the aircraft which may be defined as an assigned clearance to the aircraft or the expected flight path on which the aircraft has been cleared by an aviation-governing authority. The current trajectory could be comprised of a series of waypoints, altitude assignments, and/or time assignments. Current trajectory data 112 could be comprised of three-dimensional data representative of latitude, longitude, and altitude data; alternatively, current trajectory data 112 could include a fourth dimension of time. A common aircraft system for storing and/or maintaining current trajectory data 112 could be a flight management system ("FMS") (which includes a navigation database), a system known to those skilled in the art.

In an embodiment of FIG. 1, aircraft-proposed trajectory data 114 could be comprised of data representative of a proposed trajectory initiated by or through an aircraft system, where the proposed trajectory could be indicative of a proposed change or modification to the current trajectory data 112. The determination of a proposed trajectory could be initiated automatically. For an automatic initiation, a manufacturer and/or end user could configure such initiation on a planned schedule based upon time and/or the position of the aircraft along the current trajectory. Also, the initiation could be based upon an unplanned occurrence such as the appearance of unexpected weather, unexpected aircraft traffic, and/or an ANSP-proposed trajectory 124 (discussed in detail below). For the purpose of illustration and not limitation, an FMS may be configured to initiate the determination of a proposed modification at predetermined times and/or aircraft locations (or aircraft positions) along with the receipt of data representative of unexpected weather and/or unexpected traffic.

A proposed trajectory could be initiated manually by a pilot through a manual input system, where such manual input system could be comprised of any source that provides or enables a pilot to enter proposed trajectory information through a pilot input device. The manual input system may include, but is not limited to, a tactile device (e.g., keyboard, control display unit, cursor control device, touch screen device, etc. . . . ) and/or a speech recognition system. As embodied herein, the touch screen device could include a display unit 120 as discussed in detail below.

In an embodiment of FIG. 1, aircraft parameter data 116 may be data representative of one or more aircraft parameters from one or more aircraft that may be applied in a trajectory optimization function by a TD generator 142 to determine an optimized flight trajectory and generate proposed-trajectory data and/or responsive-trajectory data as discussed in detail below. The application of the aircraft parameter(s) may determine a proposed or responsive trajectory that represents real-time predictable and achievable aircraft performance that may affect the maneuverability and/or responsiveness of the aircraft when operating within trajectory management ("TM") operations. The advantages and benefits of the embodiments disclosed herein exploit the ability of the TD generator 142 to receive a plurality of aircraft parameters from one or more aircraft, apply them to a trajectory optimization function defined and contained in an algorithm, and determine an optimized flight trajectory unique to actual conditions of flight operations as measured by the values of the aircraft parameters.

To provide a simple example of how aircraft parameters 116 may be used in the embodiments herein, suppose the trajectory optimization function includes meteorological or environmental parameters; those skilled in the art are aware that meteorological or environmental conditions affect aircraft performance and/or maneuverability. Meteorological or environmental parameters could include, but are not limited to, data representative of air density and winds aloft, where air density may be determined by such parameters as altitude, temperature, barometric pressure, and dew point, and winds aloft may determined by such parameters as wind direction and wind speed. Here, data representative of these parameters may be provided as aircraft parameters 116 from one or more aircraft to the TD generator 142 for subsequent application in a trajectory optimization function. After the application of the aircraft parameters 116, the trajectory optimization function may determine an optimized flight trajectory unique to actual conditions of flight operations.

Other examples of aircraft parameters 116 are provided to illustrate the ability with which a manufacturer or end user may provide aircraft parameters 116 for use in the trajectory optimization function as embodied herein. In one example, the trajectory optimization function could include weight and balance parameters; if so, aircraft parameters 116 could include data representative of aircraft empty weight, center of gravity ("CG"), weight of fuel, and/or weight of cargo. In another example, the trajectory optimization function could include aircraft configuration and system parameters; if so, aircraft parameters 116 could include data representative of the configuration(s) and/or operability of the aircraft flaps/slats, speed brake position, and/or the landing gear, each of which could affect the speed and/or expected times at which the aircraft will operate within TM operations. In another example, the trajectory optimization function could include engine performance parameter(s); if so, aircraft parameters 116 could include data representative of engine performance or status or available thrust. In another example, the trajectory optimization function could include traffic information of other aircraft; if so, aircraft parameters 116 could include data representative of horizontal position, pressure altitude, vertical rate, horizontal velocity, horizontal position accuracy, horizontal velocity accuracy, and/or aircraft identification of the other aircraft. In another example, the trajectory optimization function could include parameters related to the quality of data provided by one or more of the data sources; if so, aircraft parameters 116 could include data representative of accuracy, resolution, integrity, uncertainty, and/or validity. The preceding examples are intended to provide exemplary aircraft parameters 116 that may be used in the TD generating system 100, and are not intended to provide a limitation to the embodiments discussed herein in any way, shape, or form.

As embodied in FIG. 1, the ANSP-proposed trajectory data 118 could be that data representative of a trajectory proposed by the ANSP 130. As embodied herein, the ANSP-proposed trajectory data 118 could be received by aircraft system(s) 110 and sent to the DC 140 for subsequent application to the trajectory optimization function. The proposed trajectory represented in the ANSP-proposed trajectory data 118 is the same proposed trajectory represented in the ANSP-proposed trajectory data 134.

As embodied in FIG. 1, the display unit(s) 120 could be comprised of any unit of which visual indication(s) may be presented the pilot. The display unit 120 could be comprised of any unit having a display surface on which information may be presented to the pilot. The display unit 120 could be part of an Electronic Flight Information System and could be comprised of, but is not limited to, a Primary Flight Display, Navigation Display, Head-Up Display, Head-Down Display, Multi-Purpose Control Display Unit, Engine Indicating and Crew Alerting System, Electronic Centralized Aircraft Monitor, Multi-Function Display, Side Displays, and/or Data Link Control Display Unit. As embodied herein, the display unit 120 may include a vision system (not shown) which generates an image data set which represents the image displayed on a display unit. Vision systems include, but are not limited to, a synthetic vision system ("SVS"), an enhanced vision system ("EVS"), and/or a combined SVS-EVS.

Figure 2A:
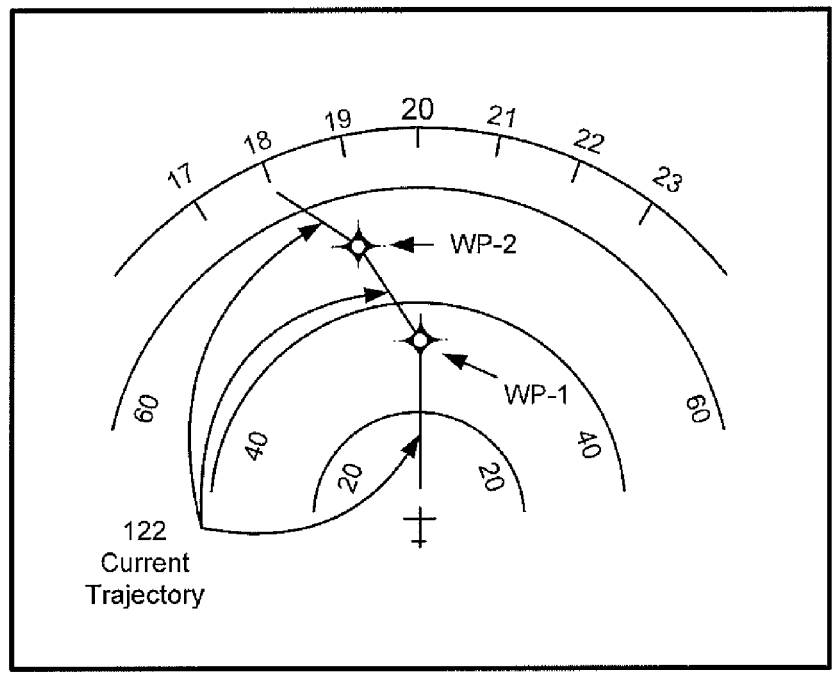
FIG. 2A provides a first exemplary depiction of a display unit for presenting trajectory information to a pilot or flight crew.

The advantages and benefits of the embodiments discussed herein may be illustrated by showing examples of how a request to change to the current trajectory of a flight path defined by waypoints may be presented on the display surface of the display unit 120. The drawings of FIG. 2 provide exemplary depictions of the display unit 120 for presenting trajectory information to the pilot or flight crew. FIG. 2A provides an exemplary depiction of how the current trajectory 122 represented by current trajectory data 112 of a flight path defined by waypoints WP-1 And WP-2 against range symbology may be presented on the display surface of the display unit 120; the presentation of additional trajectory symbology such as altitude and/or time could also be presented but has been made minimal for the sake of presentation and is not indicative of the plurality of indications or information with which it may be configured.

Figure 2B:
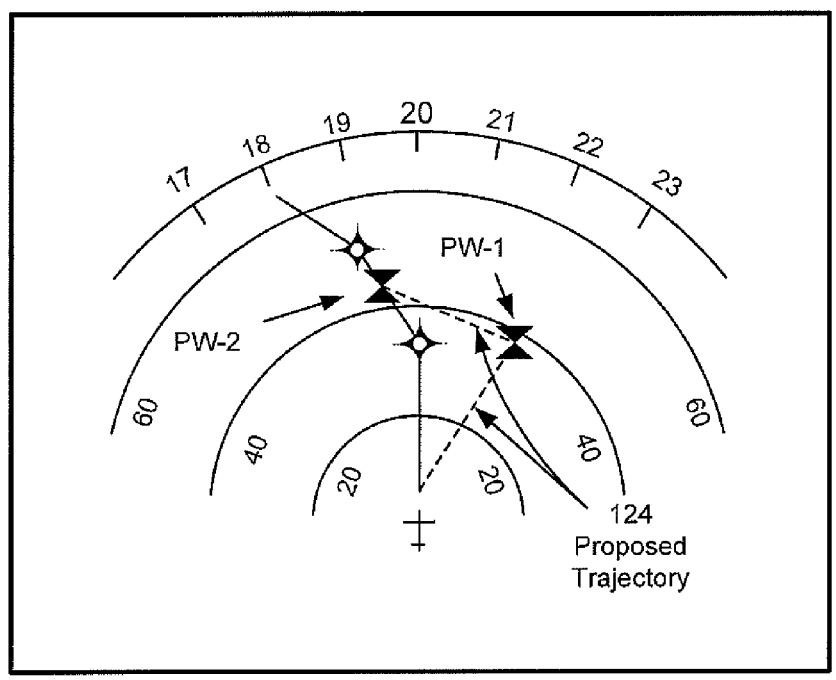
FIG. 2B provides a second exemplary depiction of a display unit for presenting trajectory information to a pilot or flight crew.

FIG. 2B provides an exemplary depiction of how a proposed trajectory 124 represented by proposed trajectory data 114 and defined by proposed waypoints PW-1 and PW-2 may be presented on the display surface of the display unit 120. As will be discussed in detail below, the proposed trajectory could be representative of a trajectory proposed by the DC 140, a trajectory proposed by the aircraft, a trajectory proposed by the ANSP 130, and/or a trajectory responsive to a proposed trajectory generated by the TD generator 142 of the DC 140.

Returning to FIG. 1, the ANSP 130 could be comprised of one or more providers of air navigation services that could provide source data to the DC 140. Such source data could be comprised of current trajectory data 132, ANSP-proposed trajectory data 134, and/or air navigation services data 136. As embodied herein, the ANSP 130 could include an aviation-governing authority. In the United States, the ANSP 130 could include the Federal Aviation Administration.

In an embodiment of FIG. 1, current trajectory data 132 may be data representative of the current trajectory that has been assigned to the aircraft. As embodied herein, the current trajectory represented in the current trajectory data 132 is the same current trajectory represented in the current trajectory data 112.

In an embodiment of FIG. 1, ANSP-proposed trajectory data 134 could be comprised of data representative of a proposed trajectory initiated by or through the ANSP 130, where the proposed trajectory could be indicative of a proposed change or modification to the current trajectory data 132. Similar to the determination of the aircraft-proposed trajectory 114, the determination of the ANSP-proposed trajectory data 134 could be initiated automatically. For an automatic initiation, the ANSP 130 could configure such initiation on a planned schedule based upon time and/or the position of the aircraft along the current trajectory. Also, the initiation could be based upon an unplanned occurrence such as changes to the one or more of the following non-exhaustive list of air navigation services that may be managed by the ANSP 130 and are known to those skilled in the art: TM, flight and state management, separation management, weather information management, aeronautical information management, surveillance information management, flow contingency management, short-term capacity management, and long-term capacity management.

A proposed trajectory could be initiated manually by a controller through a manual input system, where such manual input system could be comprised of any source that provides or enables a controller to enter proposed trajectory information through a controller input device. The manual input system may include, but is not limited to, a tactile device (e.g., keyboard, control display unit, cursor control device, touch screen device, etc. . . . ) and/or a speech recognition system.

In an embodiment of FIG. 1, navigation service data 136 could be data corresponding to the preceding non-exhaustive list of air navigation services. Navigation service data 136 corresponding to TM could be data corresponding to the means through which four-dimensional trajectories of multiple aircraft are generated, assessed, and modified for use in trajectory-based operations by the ANSP 130. Navigation service data 136 corresponding to flight and state data management could be data corresponding to the means through which an airspace system maintains and distributes all flight information, including, aircraft characteristics and capabilities, flight plans and trajectories, flight status, and clearance delivery status. Navigation service data 136 corresponding to separation management data could be data corresponding to variations of flight trajectories of aircraft to resolve projected conflicts between aircraft.

Navigation service data 136 corresponding to weather information management could be data corresponding to the means for processing raw weather information and transforming it into an integrated, comprehensive, and authoritative source for all consumers and service providers including the DC 140. Navigation service data 136 corresponding to aeronautical information management could be data corresponding to the means to ensure that all stakeholders including the DC 140 have access to critical information about system resources, procedures, constraints, and other factors impacting the use of the airspace system. Navigation service data 136 corresponding to surveillance information management could be data corresponding to the means for processing raw surveillance information and transforming it into an integrated, comprehensive, and authoritative source for all consumers and service providers including the DC 140.

Navigation service data 136 corresponding to separation management could also be data representative of ANSP 130 constraints. Such constraints could be temporary in nature such as the creation of a volume of airspace for the purpose of flight avoidance due to, for example, weather, turbulence avoidance, and/or an increase in air traffic density. Another constraint could include a line defining the imposition of a plurality of metering fixes (i.e., a fixed point defined in terms of four dimensions).

Navigation service data 136 corresponding to flow contingency management could be data corresponding to the means through which demand is adjusted to meet system resource capacity constraints. Navigation service data 136 corresponding to short-term capacity management could be data corresponding to the means through which strategic planning is performed for applying available assets to adjust system capacity to meet the demand. Navigation service data 136 corresponding to long-term capacity management could be data corresponding to the means through which new system capacity is generated or developed.

In an embodiment of FIG. 1, the DC 140 could be comprised of an operations center in which aircraft are dispatched for flight. A common example of the DC 140 is an airline operations center which employs flight dispatchers who may be responsible for planning and monitoring the progress of an aircraft in flight. A flight dispatcher may have the authority to delay, divert, and/or cancel a flight at any time. As embodied herein, the DC 140 may be comprised of a TD generator 142.

In an embodiment of FIG. 1, the TD generator 142 may be any electronic data processing unit which executes software or source code stored, permanently or temporarily, in a digital memory storage device as discussed above. The TD generator 142 may be driven by the execution of software or source code containing algorithms developed for the specific functions embodied herein. Common examples of electronic data processing units are microprocessors, Digital Signal Processors, Programmable Logic Devices, Programmable Gate Arrays, and signal generators; however, for the embodiments herein, the term generator is not limited to such processing units and its meaning is not intended to be construed narrowly. For instance, a processor could also consist of more than one electronic data processing units. As embodied herein, the TD generator 142 could be a processor(s) used by or in conjunction with any other system of the aircraft.

The TD generator 142 may be programmed or configured to exchange data with the aircraft system 110 and the ANSP 130. As embodied herein, the terms "programmed" and "configured" are synonymous with respect to the execution of software or source code developed for the specific functions and methods embodied herein. The TD generator 142 may be programmed to execute the methods embodied herein and discussed in detail below.

The advantages and benefits of the embodiments discussed herein may be illustrated by showing examples of exchanges of data that could occur between the DC 140, the aircraft system 110, and/or the ANSP 130 when a flight trajectory negotiation has been initiated and from which a trajectory is proposed and/or a responsive trajectory is generated. This negotiation between the DC 140, the aircraft system 110, and/or the ANSP 130 may be made automatically and without knowledge of the pilot; however, prior to being established as a current trajectory, a proposed trajectory and/or a responsive trajectory may require a pilot's acceptance. These are examples provided as a matter of illustration and not limitation of the embodiments disclosed herein.

Figure 3A:
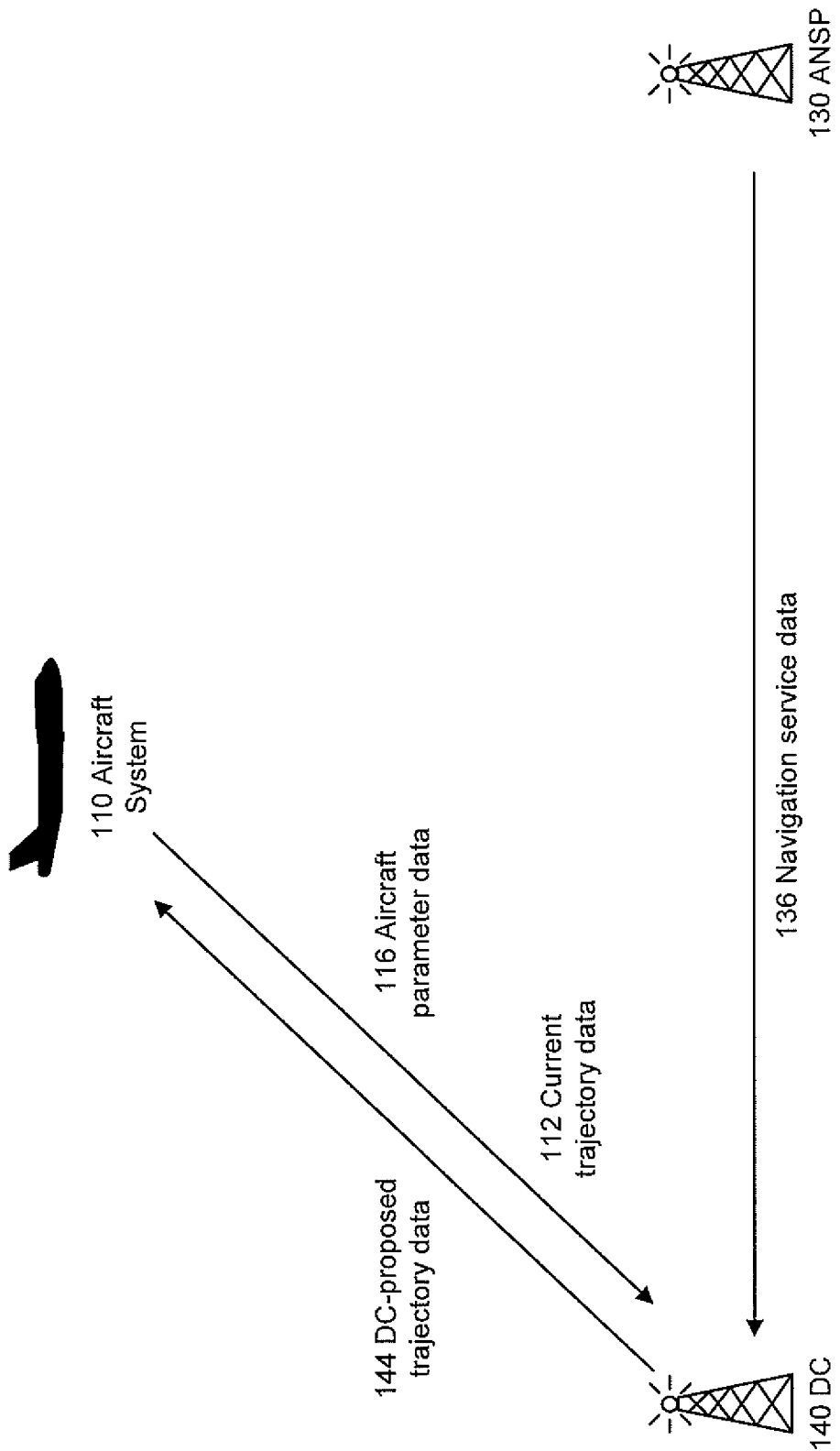
FIG. 3A illustrates an exchange of data when a DC has initiated a flight trajectory negotiation.

The drawings of FIG. 3 illustrate an exchange of data that could occur when a flight trajectory negotiation has been initiated by the DC 140. This initiation could be made automatically and/or manually by the DC 140. Referring to FIG. 3A, when the DC 140 has initiated the trajectory negotiation, the DC 140 may send a request for data to the aircraft system 110 of one or more aircraft which, in turn, may respond by sending data representative of aircraft parameter 116 to the DC 140. If current trajectory data is not maintained or stored by the DC 140, the DC 140 may send a request for such current trajectory data 112 to the aircraft system 110 which, in turn, may respond by sending such data to the DC 140 (current trajectory data could also be obtained from the ANSP 130). In addition, the DC 140 may send a request for data to the ANSP 130 which, in turn, may respond by sending data representative of navigation service data 136 to the DC 140.

After the aircraft parameter data 116, the current trajectory data, and the navigation service data 136 have been received, the DC 140 may determine an optimized flight trajectory for the aircraft. The result of this determination may be sent to the aircraft system 110 as DC-proposed trajectory data 144, where a pilot of the aircraft system 110 may be informed of the DC-proposed trajectory (e.g., presenting the trajectory on the surface of the display unit 120), where he or she may take subsequent action in response to receiving such information.

Figure 3B:
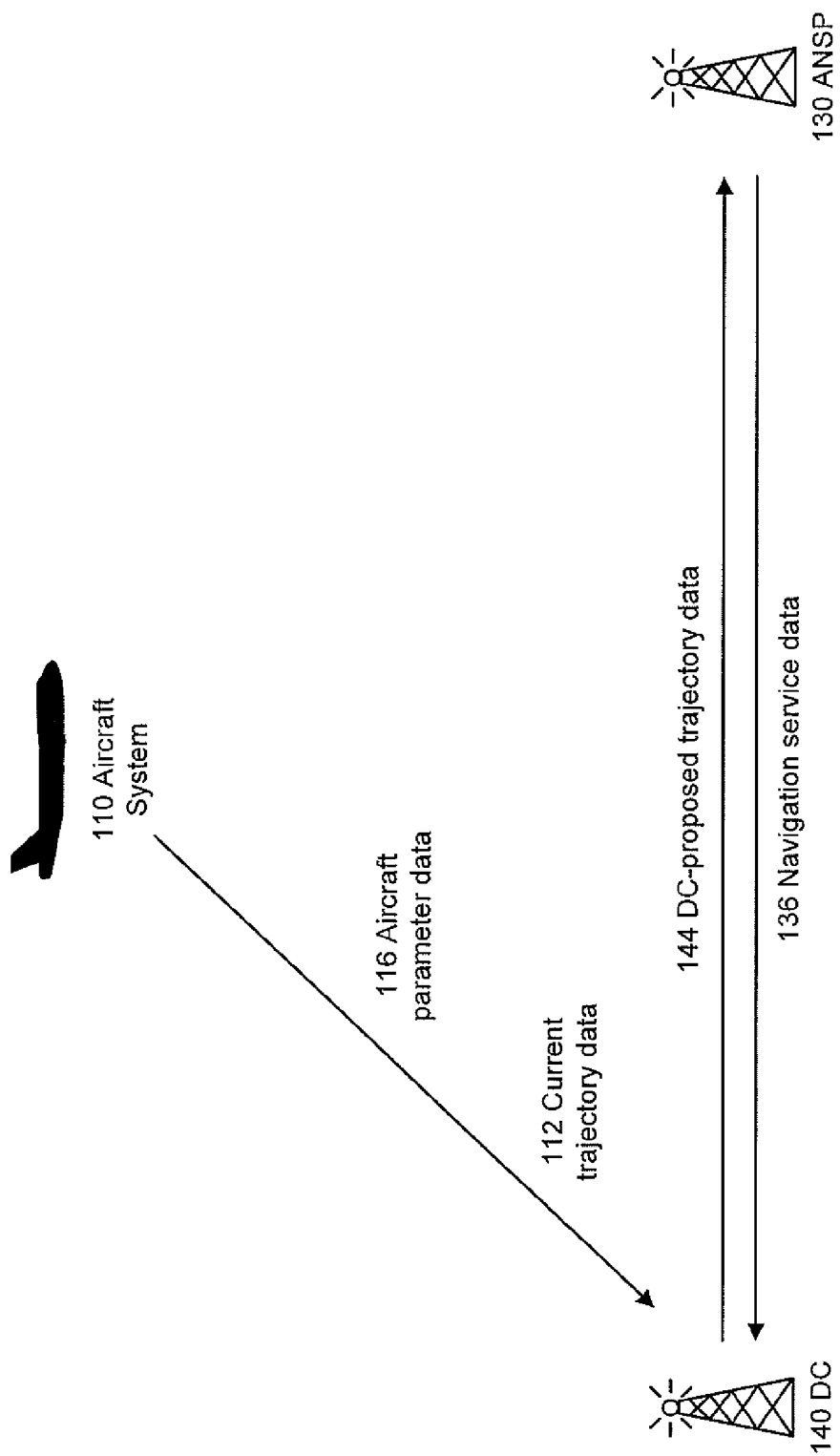
FIG. 3B illustrates a second exchange of data when a DC has initiated a flight trajectory negotiation.

Referring to FIG. 3B, the DC-proposed trajectory data 144 may be sent to the ANSP 130, where subsequent action could be taken by the ANSP 130 in response to receiving such information. In addition to the DC-initiated trajectory negotiation, the drawings of FIG. 3 may also be used to illustrate an exchange of data that could occur when the aircraft system 110 and/or the ANSP 130 initiate a trajectory negotiation by soliciting a proposed trajectory from the DC 140. Similar to the DC-initiated trajectory negotiation, an aircraft-solicited trajectory negotiation and/or ANSP-solicited trajectory negotiation could be made automatically through a defined schedule and/or manually.

Figure 4A:
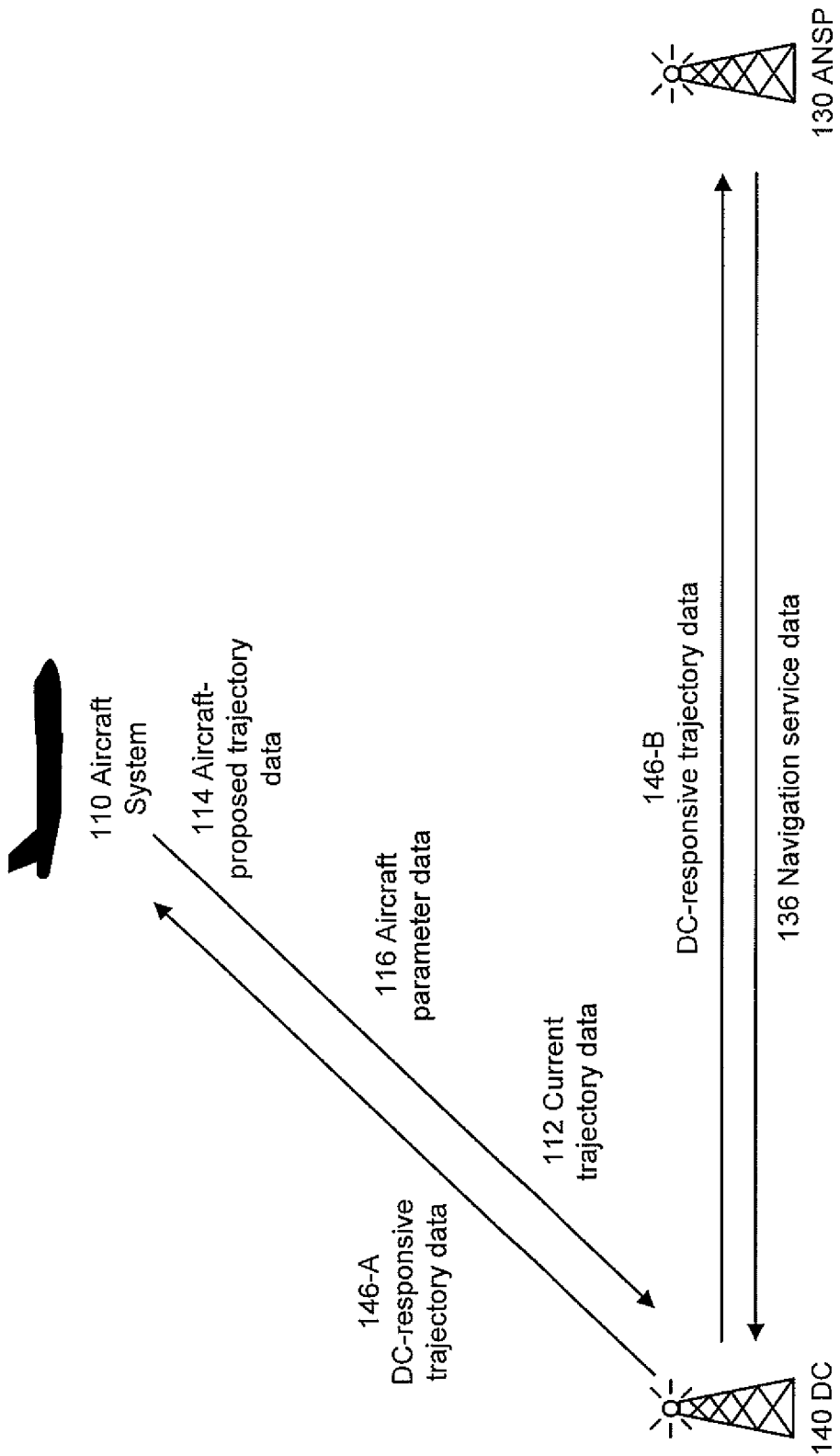
FIG. 4A illustrates an exchange of when an aircraft system has initiated a flight trajectory negotiation.

The drawings of FIG. 4 illustrate an exchange of data that could occur when a flight trajectory negotiation has been initiated by the aircraft system 110 of an aircraft. This initiation could be made automatically and/or manually. Referring to FIG. 4A, when the aircraft system 110 has initiated the trajectory negotiation, the aircraft system 110 may send proposed trajectory data 114 and aircraft parameter data 116 to the DC 140. If current trajectory data is not maintained by the DC 140, the DC 140 may send a request for such current trajectory data to the aircraft system 110 of one or more aircraft which, in turn, may respond by sending such data to the DC 140 (current trajectory data could also be obtained from the ANSP 130). In addition, the DC 140 may send a request for data to the ANSP 130 which, in turn, may respond by sending data representative of navigation service data 136 to the DC 140.

After the aircraft-proposed trajectory data 114, the aircraft parameter data 116, the current trajectory data, and the navigation service data 136 have been received, the DC 140 may determine an optimized flight trajectory for the aircraft and compare the results of the determination against the aircraft-proposed trajectory data 114. The result of this comparison may be sent to the aircraft system 110 as DC-responsive trajectory data 146-A, which could be data representative of an acceptance of the aircraft-proposed trajectory data 114, a rejection of the aircraft-proposed trajectory data 114, and/or a DC-proposed trajectory based upon the optimized flight trajectory. Then, a pilot may be informed of the acceptance, rejection, and/or DC-proposed trajectory data 144, where he or she may take subsequent action in response to receiving such information.

In addition, the results of the negotiation between the aircraft system 110 and the DC 140 could be provided to the ANSP 130. Referring to FIG. 4A, DC-responsive trajectory data 146-B may be sent to the ANSP 130, where subsequent action could be taken by the ANSP 130 in response to receiving such information.

Figure 4B:
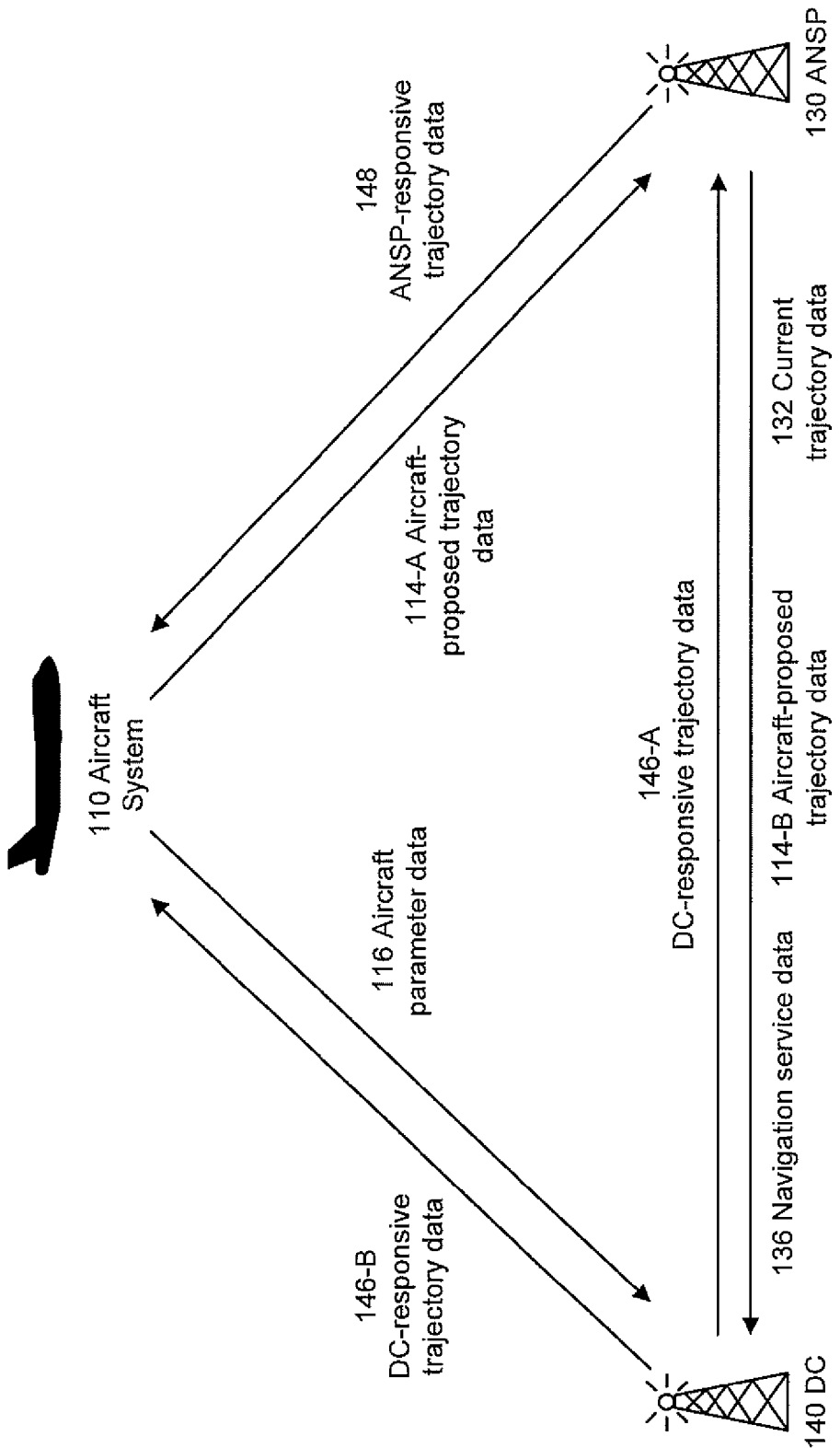
FIG. 4B illustrates a second exchange of when an aircraft system has initiated a flight trajectory negotiation.

Referring to FIG. 4B, the DC 140 may be informed of the aircraft-proposed trajectory 114-A by the ANSP 130. The ANSP 130 may send aircraft-proposed trajectory data 114-B and navigation service data 136 to the DC 140. Then, the DC 140 may send a request for data to the aircraft system 110 which, in turn, may respond by sending the aircraft parameter data 116 to the DC 140. If current trajectory data is not maintained or stored by the DC 140, the DC 140 may send a request for such current trajectory data to the ANSP 130 which, in turn, may respond by sending the current trajectory data 132 to the DC 140 (the current trajectory data could also be obtained from the aircraft system 110).

After the aircraft-proposed trajectory data 114-B, the aircraft parameter data 116, the current trajectory data, and the navigation service data 136 have been received, the DC 140 may determine an optimized flight trajectory for the aircraft and compare the results of the determination against the aircraft-proposed trajectory data 114-B. The result of this comparison may be sent to the ANSP 130 as DC-responsive trajectory data 146, which could be data representative of an acceptance of the aircraft-proposed trajectory data 114-B, a rejection of the aircraft-proposed trajectory data 114-B, and/or a DC-proposed trajectory based upon the optimized flight trajectory. Then, the ANSP 130 may be informed of the acceptance, rejection, and/or aircraft-proposed trajectory 114, where subsequent action could be taken by the ANSP 130 in response to receiving such information. The result of this action may be sent to the aircraft system 110 as ANSP-responsive trajectory data 148, which could be data representative of an acceptance of the DC-responsive trajectory data 146-A, a rejection of the DC-responsive trajectory data 146-A, and/or an ANSP-proposed trajectory.

In addition, the results of the negotiation between the ANSP 130 and the DC 140 could be provided to the aircraft system 110. Referring to FIG. 4B, DC-responsive trajectory data 146-B may be sent to the aircraft system 110, where subsequent action could be taken by the pilot in response to receiving such information.

Figure 5A:
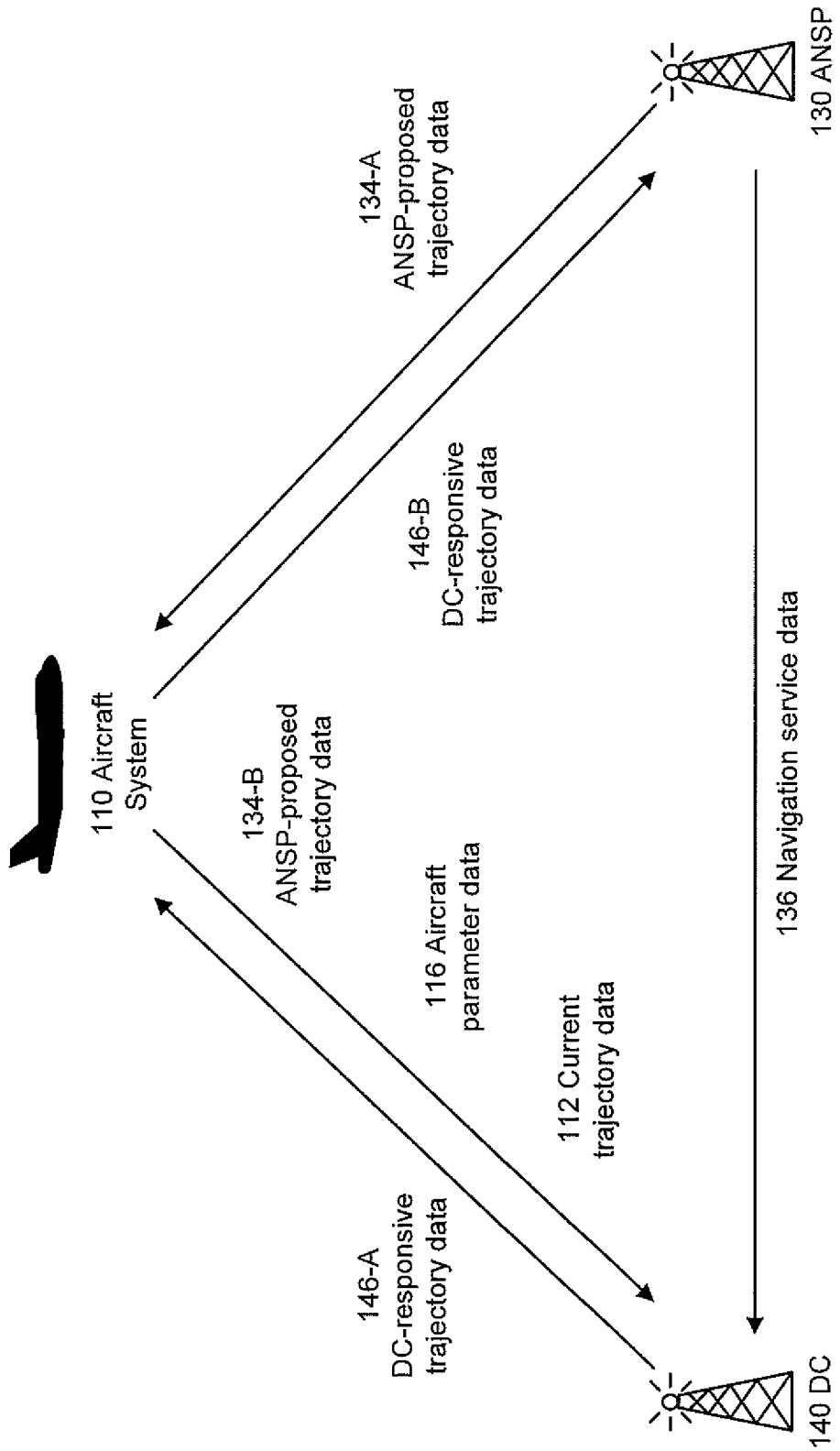
FIG. 5A illustrates an exchange of data when an ANSP has initiated a flight trajectory negotiation.

The drawings of FIG. 5 illustrate an exchange of data that could occur when a flight trajectory negotiation has been initiated by the ANSP 130. This initiation could be made automatically and/or manually. Referring to FIG. 5A, when the ANSP 130 has initiated the trajectory negotiation, the ANSP 130 may send ANSP-proposed trajectory data 134-A to the aircraft system 110. Then, the aircraft system 110 may send the ANSP-proposed trajectory data 134-B and aircraft parameter data 116 to the DC 140. If current trajectory data is not maintained by the DC 140, the DC 140 may send a request for such current trajectory data to the aircraft system 110 of one or more aircraft which, in turn, may respond by sending such data to the DC 140 (current trajectory data could also be obtained from the ANSP 130). In addition, the DC 140 may send a request for data to the ANSP 130 which, in turn, may respond by sending navigation service data 136 to the DC 140.

After the ANSP-proposed trajectory data 134-B, the aircraft parameter data 116, the current trajectory data, and the navigation service data 136 have been received, the DC 140 may determine an optimized flight trajectory for the aircraft 110 and compare the results of the determination against the ANSP-proposed trajectory data 134-B. The result of this comparison may be sent to the aircraft system 110 as DC-responsive trajectory data 146-A, which could be data representative of an acceptance of the ANSP-proposed trajectory data 134-B, a rejection of the ANSP-proposed trajectory data 134-B, and/or a DC-proposed trajectory based upon the optimized flight trajectory. Then, a pilot may be informed of the acceptance, rejection, and/or DC-proposed trajectory, where he or she may take subsequent action in response to receiving such information which could include sending the DC-responsive data 146-B to the ANSP 130.

Figure 5B:
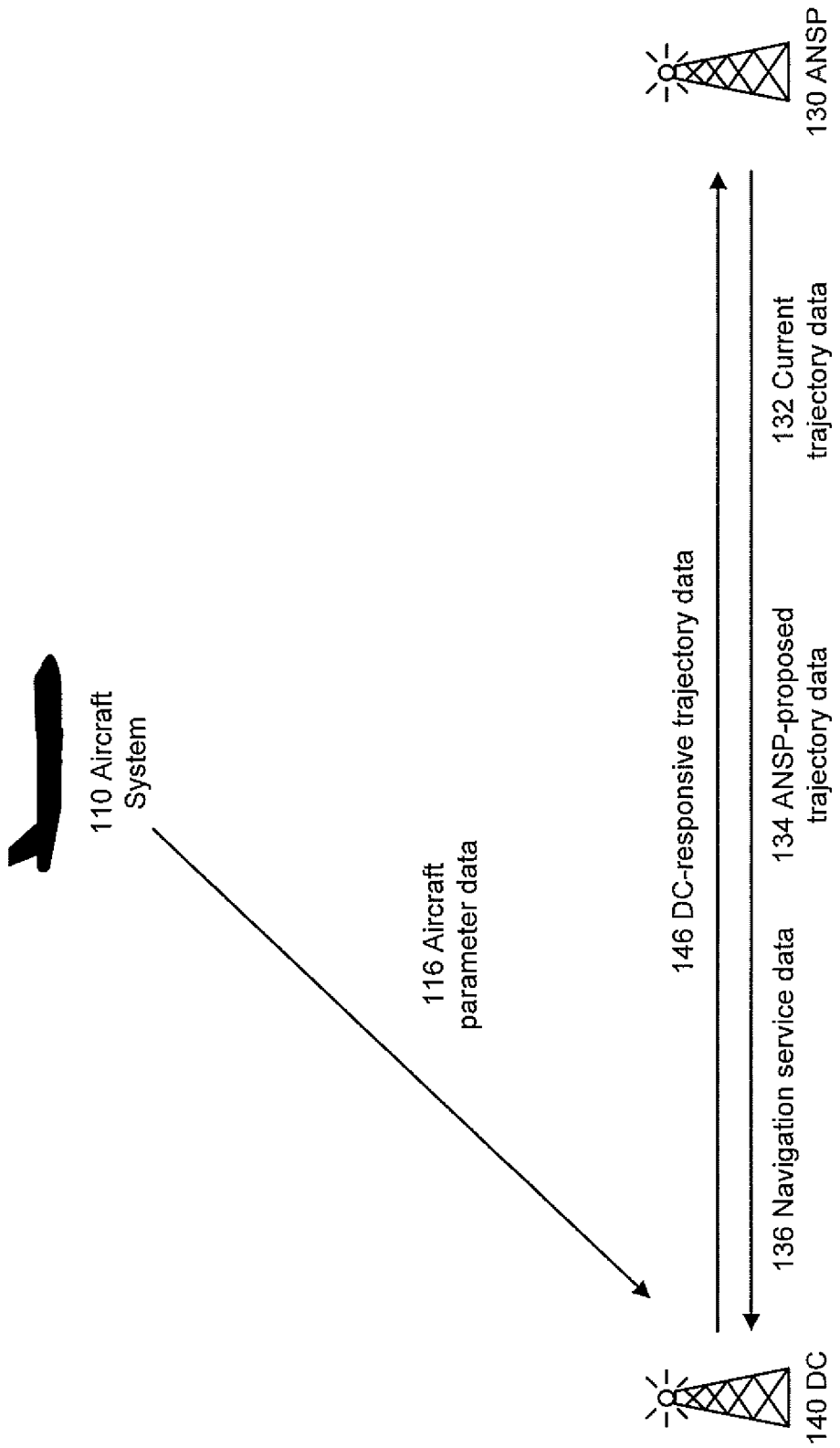
FIG. 5B illustrates a second exchange of data when an ANSP has initiated a flight trajectory negotiation.

Referring to FIG. 5B, the DC 140 may be informed of the ANSP-proposed trajectory 134 by the ANSP 130. The ANSP 130 may send ANSP-proposed trajectory data 134 and navigation service data 136 to the DC 140. Then, the DC 140 may send a request for data to the aircraft system 110 which, in turn, may respond by sending the aircraft parameter data 116 to the DC 140. If current trajectory data is not maintained or stored by the DC 140, the DC 140 may send a request for such current trajectory data to the ANSP 130 which, in turn, may respond by sending the current trajectory data 132 to the DC 140 (the current trajectory data could also be obtained from the aircraft system 110).

After the ANSP-proposed trajectory data 134, the aircraft parameter data 116, the current trajectory data, and the navigation service data 136 have been received, the DC 140 may determine an optimized flight trajectory for the aircraft and compare the results of the determination against the ANSP-proposed trajectory data 134. The result of this comparison may be sent to the ANSP 130 as DC-responsive trajectory data 146, which could be data representative of an acceptance of the ANSP-proposed trajectory data 134, a rejection of the ANSP-proposed trajectory data 134, and/or a DC-proposed trajectory based upon the optimized flight trajectory. Then, the ANSP 130 may be informed of the acceptance, rejection, and/or ANSP-proposed trajectory 134, where subsequent action could be taken by the ANSP 130 in response to receiving such information.

Figure 6:
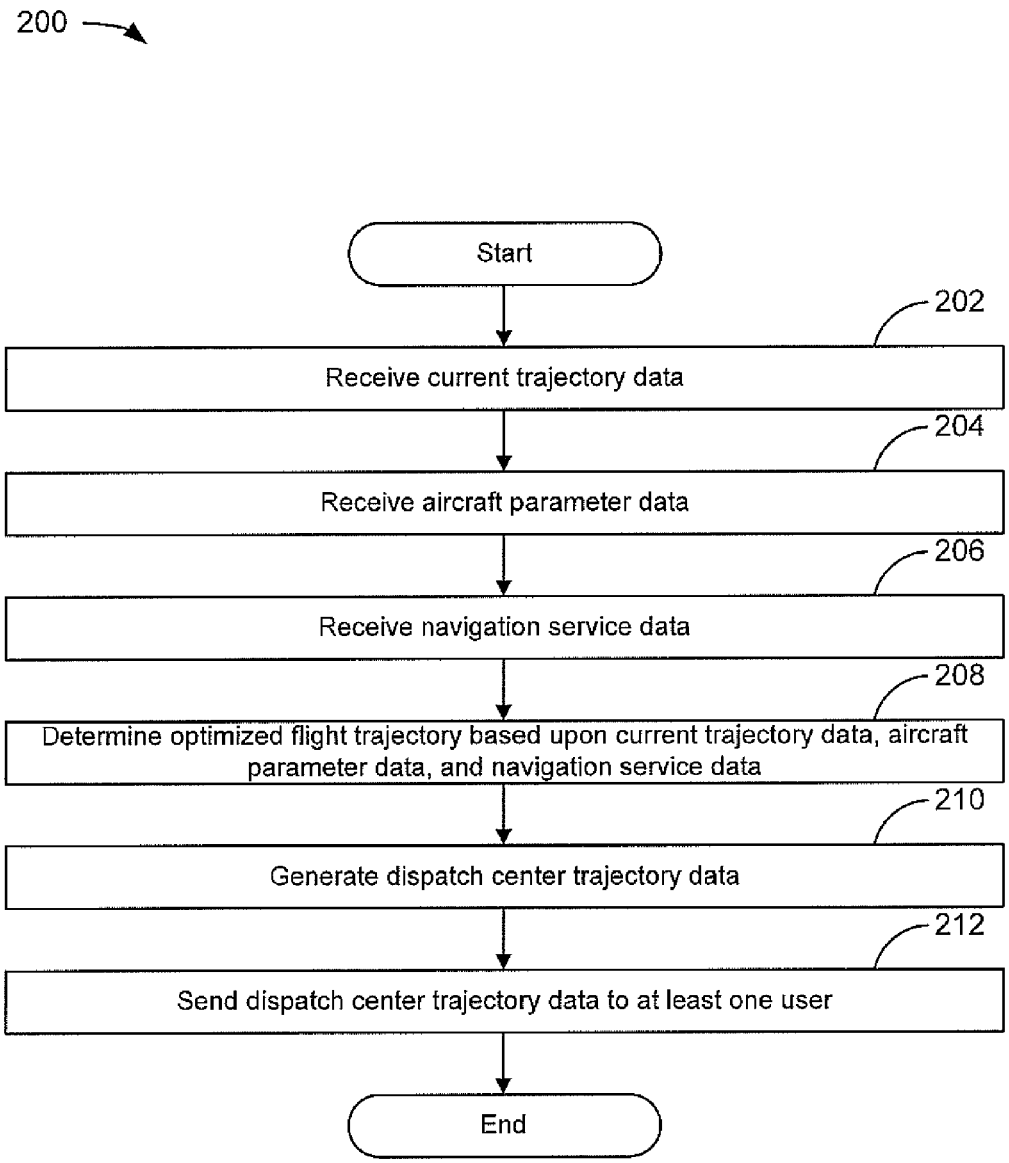
FIG. 6 depicts a flowchart of a method for generating trajectory data for an aircraft in flight.

In an embodiment of FIG. 6, flowchart 200 depicts a method for generating trajectory data for an aircraft in flight, where the TD generator 142 may be programmed or configured with instructions corresponding to the following modules embodied in the flowchart. Also, TD generator 142 may be a processor of a module such as, but not limited to, a printed circuit board having one or more input interfaces to facilitate the two-way data communications of the TD generator 142, i.e., to facilitate the receiving and providing of data. As necessary for the accomplishment of the following modules embodied in the flowchart, the receiving of data is synonymous and/or interchangeable with the retrieving of data, and the providing of data is synonymous and/or interchangeable with the making available or supplying of data.

As embodied in FIG. 6, a flowchart 200 is depicted disclosing an example of a method for generating trajectory data for an aircraft in flight participating in an trajectory management operation, where the TD generator 142 may be programmed or configured with instructions corresponding to the following modules embodied in the flowchart. Also, the TD generator 142 may be a processor of a module such as, but not limited to, a printed circuit board having one or more input interfaces to facilitate the two-way data communications of the TD generator 142, i.e., to facilitate the receiving and providing of data. As necessary for the accomplishment of the following modules embodied in the flowchart, the receiving of data is synonymous and/or interchangeable with the retrieving of data, and the sending of data is synonymous and/or interchangeable with the providing of data and/or making available or supplying of data.

The flowchart begins with module 202 with the receiving of current trajectory data from a current trajectory data source. In one embodiment, the current trajectory data source could be comprised of the database of the DC 140, where the receiving of current trajectory data includes a retrieving of such data from the database. In another embodiment, the current trajectory data source could be comprised of the aircraft system 110 and/or the ANSP 130.

The flowchart continues with module 204 with the receiving of aircraft parameter data 116 from an aircraft parameter data source. As embodied herein, the aircraft parameter data source could be the aircraft system 110. Additionally, the aircraft parameter data source could be the aircraft system 110 from a plurality of aircraft.

The flowchart continues with module 206 with the receiving of navigation service data from a navigation service data source. As embodied herein, the navigation service data source could be the ANSP 130.

In an embodiment in which the proposed trajectory negotiation has not been initiated by the DC 140, there could be a receiving of proposed trajectory data from a data source that is external to the DC 140. As embodied herein, the proposed trajectory data could be received from the aircraft system 110 and/or the ANSP 130.

The flowchart continues with module 208 with the determining of an optimized flight trajectory. The optimized flight trajectory could be determined by applying the current trajectory data, the aircraft parameter data 116, and the navigation service data 136 to one or more trajectory optimization functions. In one embodiment, the trajectory optimization function may be based on minimizing cost which may or may not include a variable for fuel consumption. In another embodiment, the trajectory optimization function may be based on minimizing time. In another embodiment, the trajectory optimization function may be based upon an internal prioritization employed by an operator who has multiple aircraft arriving at approximately the same time. In another embodiment, the trajectory optimization function may be based upon any combination of cost, time, and/or internal prioritization. Trajectory optimization functions could be software tools that are known to those skilled in the art.

In the embodiment in which proposed trajectory data is received from a data source external to the DC 140, the optimized flight trajectory may be compared to the proposed trajectory to determine the acceptability of the proposed trajectory data. If the result of the comparison is favorable, then the proposed trajectory may be accepted. If the result of the comparison is unfavorable, the proposed trajectory may be rejected.

The flowchart continues with module 310 with the generating of DC trajectory data, where such data is representative of the optimized flight trajectory. In an embodiment in which the proposed trajectory has been received from a data source external to the DC 140, the DC trajectory data could include data representative of the acceptability information of the proposed trajectory (i.e., acceptable or unacceptable).

The flowchart continues with module 312 with the sending of the DC trajectory data to at least one user external to the DC 140. In an embodiment in which the proposed trajectory has been received from a data source external to the DC 140, the user could be such data source. In an additional embodiment, the DC trajectory data could be provided to a data source from which the proposed trajectory was not received. In an embodiment in which the aircraft system 110 has been provided the DC trajectory data, the information represented in the DC trajectory data may be presented to the pilot. Then, the flowchart proceeds to the end.

It should be noted that the method steps described above may be embodied in computer-readable media as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A system for generating trajectory data for an aircraft in flight, such system comprising:
    a source of current trajectory data;
    a source of aircraft parameter data;
    an air navigation services provider; and
    a trajectory data generator employed by a dispatch center and configured to
        receive current trajectory data of a first aircraft,
        receive aircraft parameter data sent out by a system installed in the first aircraft, where
            the aircraft parameter data
                is representative of a plurality of actual parameters of the first aircraft and
                corresponds or relates to aircraft performance,
        receive navigation services data sent out by an air navigation services provider,
        determine a proposed, optimized flight trajectory for the first aircraft, where
            such determination applies a trajectory optimizing function employed by a dispatch center and is based upon
                the current trajectory data of the first aircraft,
                the aircraft parameter data, and
                the navigation services data,
        generate dispatch center-proposed trajectory data representative of the proposed, optimized flight trajectory, and
        send the dispatch center-proposed trajectory data to at least one user comprised of
            the system installed in the first aircraft,
            the air navigation services provider, or
            both.

2. The system of claim 1, wherein
    the source of current trajectory data is
        a database of the dispatch center,
        the aircraft system of the first aircraft, or
        the air navigation services provider.

3. The system of claim 1, wherein the source of aircraft parameter data is an aircraft system of at least one second aircraft.

4. The system of claim 1, wherein the trajectory optimizing function is based upon cost minimization or time minimization.

5. The system of claim 1, wherein the trajectory optimizing function is based upon an operator's internal prioritization.

6. The system of claim 1, wherein the trajectory optimizing function is based upon any combination of the following: cost minimization, time minimization, and an operator's internal prioritization.

7. The system of claim 1, further comprising:
a source of proposed trajectory data, where
the trajectory data generator is further configured to
receive proposed trajectory data representative of a proposed flight trajectory for the aircraft, and
determine the acceptability of the proposed flight trajectory, such that
data representative of acceptability information of the proposed flight trajectory is included in the dispatch center-proposed trajectory data.

8. The system of claim 7, wherein
the source of proposed trajectory data is
the system installed in the first aircraft,
the air navigation services provider, or
both.

9. A method employed by a trajectory generator of a dispatch center for generating trajectory data for an aircraft in flight, such method comprising:
receiving current trajectory data of a first aircraft;
receiving aircraft parameter data sent out by a system installed in the first aircraft, where
the aircraft parameter data
is representative of a plurality of actual parameters of the first aircraft and corresponds or relates to aircraft performance;
receiving navigation services data sent out by an air navigation services provider;
determining a proposed, optimized flight trajectory for the first aircraft, where
such determination applies a trajectory optimizing function employed by a dispatch center and is based upon
the current trajectory data of the first aircraft,
the aircraft parameter data, and
the navigation services data;
generating dispatch center-proposed trajectory data representative of the proposed, optimized flight trajectory; and
sending the dispatch center-proposed trajectory data to at least one user comprised of
the system installed in the first aircraft,
the air navigation services provider, or
both.

10. The method of claim 9, wherein
the current trajectory data is received from
a database of the dispatch center,
the aircraft system of the first aircraft, or
the air navigation services provider.

11. The method of claim 9, wherein the aircraft parameter data is received from an aircraft system of at least one second aircraft.

12. The method of claim 9, wherein the trajectory optimizing function is based upon cost minimization or time minimization.

13. The method of claim 9, wherein the trajectory optimizing function is based upon an operator's internal prioritization.

14. The method of claim 9, wherein the trajectory optimizing function is based upon any combination of the following: cost minimization, time minimization, and an operator's internal prioritization.

15. The method of claim 9, further comprising:
receiving proposed trajectory data representative of a proposed flight trajectory for the aircraft, and
determining the acceptability of the proposed flight trajectory, such that
data representative of acceptability information of the proposed flight trajectory is included in the dispatch center-proposed trajectory data.

16. The method of claim 15, wherein
the proposed trajectory data is received from
the system installed in the first aircraft,
the air navigation services provider, or
both.

* * * * *